Aug. 22, 1944.  C. C. FUERST  2,356,455

CAMERA SHUTTER

Filed May 4, 1943

CARL C. FUERST
INVENTOR

BY Newton M Perkins
James H. Stewart
ATTORNEYS

Patented Aug. 22, 1944

2,356,455

UNITED STATES PATENT OFFICE 2,356,455

CAMERA SHUTTER

Carl C. Fuerst, Rochester, N. Y., assignor to Eastman Kodak Company, Rochester, N. Y., a corporation of New Jersey Application May 4, 1943, Serial No. 485,597

6 Claims. (Cl. 95—62)

This invention relates to photography and more particularly to simple and inexpensive shutters for photographic cameras. One object of my invention is to provide a shutter consisting of a minimum number of parts which can be readily assembled and which is designed primarily to give a single reliable exposure. Another object of my invention is to provide a simple type of shutter in which a simple type of drive is used to actuate the shutter blades. Other objects will appear from the following specification, the novel features being particularly pointed out in the claims at the end thereof.

In the drawing wherein like reference characters denote like parts throughout:

Figure 1:
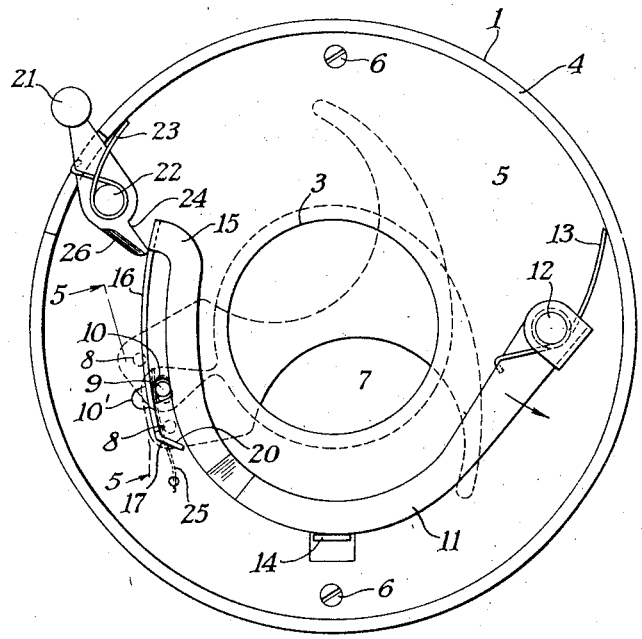
Fig. 1 is a top plan view of a shutter constructed in accordance with a preferred embodiment of my invention and with the shutter parts in a normal position of rest.
Figure 3:
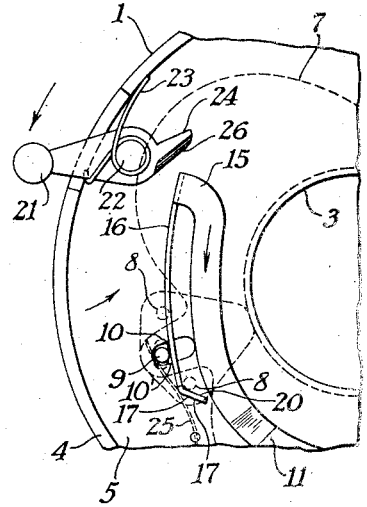
Fig. 3 is a fragmentary plan view of the shutter parts during the time the shutter blades are in a fully-opened position.

My invention consists in providing an inexpensive type of two-blade shutter in which the blades are moved in opposite directions to both open and close an exposure aperture. This movement takes place when a shutter trigger is depressed to set and release a master member which contacts directly with the shutter leaves. By the construction, which will be hereinafter fully described, it is possible to produce reliable exposures with a shutter constructed with a minimum number of parts and with a shutter structure which is extremely simple to both make and assemble.

More specifically, my shutter may consist of a support 1 which may be in the form of a shutter casing having a bottom wall 2 with a central exposure aperture 3 and an upstanding flange 4 extending around the periphery of the shutter. A shutter cover (not shown in the drawing) may be placed over the shutter mechanism which may be mounted upon a mechanism plate 5 attached in a suitable manner as by screws 6 to the bottom plate 2.

Figure 5:
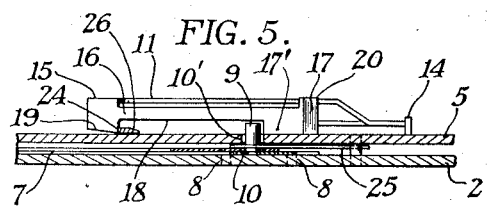
Fig. 5 is a fragmentary detail section taken on line 5—5 of Fig. 1.

The shutter aperture 3 is normally covered by a pair of shutter leaves 7 which are mounted upon spaced pivots 8 which lie to one side of the exposure aperture 3. The shutter leaves are similar in shape, one being the right-handed and the other being the left-handed. One of the shutter leaves 7 carries an upstanding shutter leaf operating pin 9 which, as best shown in Fig. 5, extends through a slot 10 in the opposite shutter leaf 7. The pin 9 extends upwardly through a slot 10' in the mechanism plate 5 and, by oscillating this pin in a general radial direction with respect to the exposure aperture 3, the shutter leaves may be moved to open and close the exposure aperture 3.

The master member 11 is pivoted at 12 to the mechanism plate and a spring 13 encircling this pivot always tends to drive the master member 11 in a counter clockwise direction as indicated by the arrow in Fig. 1. A lug 14 struck up from the mechanism plate 5 provides a rest position against which the master member usually lies as indicated in Fig. 1. The end 15 of the master member is formed outwardly and downwardly into a flange 16 which, as best shown in Fig. 5, is provided with a cam surface 17 on the extreme end, with a cutout 18 through the central section and with a beveled surface 19 on the portion opposite the cam end 17. It should be noticed that the cam 17 has a portion 20 which may engage an edge of the master member 11 so that the cam 17 is prevented from moving a material distance toward the exposure aperture 3 even though the flange 16 is sufficiently resilient to move in an opposite direction a distance sufficient to permit the pin 8 to pass therebetween as indicated in Fig. 4.

The master member is set and released by means of a trigger 21 pivotally attached at 22 to the mechanism plate and normally moved in a clockwise direction by means of a spring 23. Thus, the normal position of rest of the trigger is shown in Fig. 1.

Figure 2:
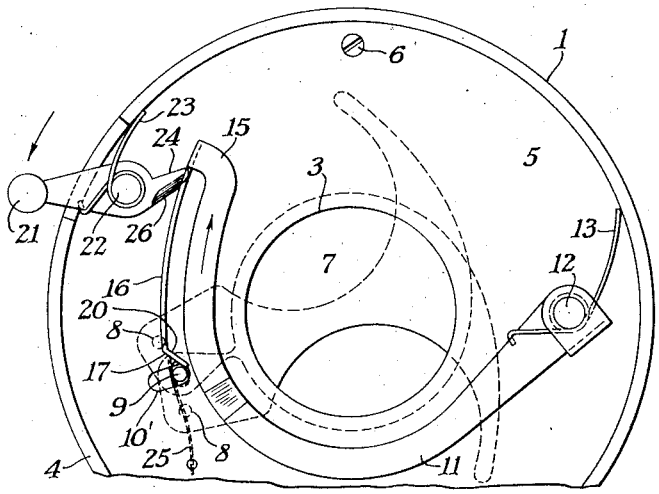
Fig. 2 is a view similar to Fig. 1 but with parts of the shutter broken away and with the shutter parts in the position they assume just before an exposure is to be made.
Figure 4:
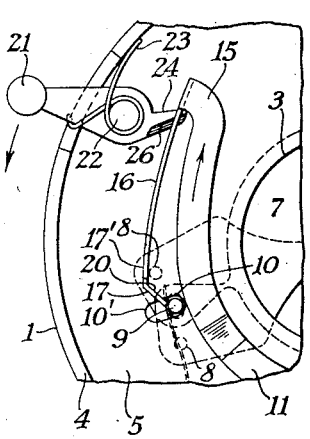
Fig. 4 is a view similar to Fig 3 but with the shutter parts being tensioned to produce an exposure.

With the parts in this position a downward movement on the trigger 21 will cause a blade ring operating arm 24 extending inwardly from the trigger to engage the flange portion 19 of the master member 11 and as the trigger moves downwardly the spring cam element 17 will move outwardly, as shown in Fig. 4, to permit the pin 9 to pass, after which the spring cam 17 springs inwardly, so that, when the trigger reaches the position slightly beyond that shown in Fig. 2 and the arm 24 releases or rides off the master member flange 19, the spring 13 may rapidly move the master member in a counter-clockwise direction about its pivot 12 causing the cam 17 to first strike the pin 9 as shown in Fig. 2. Continued movement of the master member causes the pin 9 to move rapidly in a generally radial direction to open the shutter leaves and to hold them open during the time the arcuate cam surface 17' is opposite the pin 9. However, as soon as the master member moves to a position in which the pin 9 lies opposite the slot 18, the blades will close under the influence of a light spring 25 which exerts a thrust on the pin 9 and toward the center of the exposure aperture 3.

After an exposure has been thus made the trigger spring 23 returns the trigger 21 to its Fig. 1 position. During this movement the beveled surface 26 of the trigger engages and rides under the beveled flange 19 of the master member until it engages the end of the cut-out portion 18 as shown in Fig. 5. From this position another exposure can be made by repeating the operations above described which occur when the trigger 21 is depressed.

There are a number of advantages in my improved construction. One of these advantages is that the construction of the spring cam, which may be formed directly from the material of which the master member 11 is made, is such that fine adjustments need not be made. In initially laying out the shutter it is a simple matter to provide a cam shape which will hold the shutter blades open the required length of time. This can be done by making that portion 17' of the cam longer or shorter as may be required. Having once established the length of this portion of the cam, no further adjustments need be made because the time of exposure is primarily controlled by this portion of the cam. Of course, the factors of the time of opening and closing the shutter blades cannot be separately controlled because the slope of the cam 17 and the speed of the master member 11 control the opening movement of the shutter blades and the light spring 25 controls the closing movement. It has been found, however, that the construction shown in the drawing lends itself to the construction of a quite efficient shutter because the blades are held in their fully-opened position by the cam portion 17' and because this portion of the exposure time is a comparatively large percent of the total time that the blades are open from the start of the opening movement to the completion of the closing movement.

Moreover, the construction outlined above is extremely simple so that the shutter may be readily constructed and assembled.

I am aware that two blade shutters of the same general type have been made and patented before, but in most instances the construction is much more complicated than the construction which I use primarily because it has been customary to interpose one or more additional levers between the master member and the blade-operating member. By providing the blade-operating member in the form of a pin carried by one blade and engaging the other and by having the master member directly engage this pin, a much simpler and more efficient structure is provided. In addition, the spring cam arm need not be particularly accurately made and the degree of spring in the material does not have to be accurately maintained because the cam flange 17 strikes the edge of the master member 11 during its driven stroke to open the blades. When, however, the master member is being set, the spring cam member needs only sufficient resilience to permit the blade driving pin 9 to pass as indicated above.

I claim:

1. A camera shutter comprising, in combination, an apertured support, a pair of shutter blades pivotally mounted thereon on spaced pivots, one blade carrying a pin projecting through a slot in the other blade, a master member pivotally carried by the support and spring held in a rest position, a spring flange carried by the master member including a cam shaped end and having a cut out therein, said master member pivot being so located relative to the blade pin that movement on said pivot may engage the cam and pin to move the blades to an open position when said master member moves toward its rest position, and a shutter trigger including an arm positioned to engage and move the master member from its rest position until it slips off the master member releasing it for movement under its spring.

2. A camera shutter comprising, in combination, an apertured support, a pair of shutter blades pivotally mounted thereon on spaced pivots, one blade carrying a pin projecting through a slot in the other blade, a master member pivotally carried by the support and spring held in a rest position, a spring flange carried by the master member including a cam shaped end and having a cut out therein, the spring cam end lying in a position in which the master member forms a stop preventing flexing except in a direction away from the master member, said master member pivot being so located relative to the blade that movement on said pivot may engage the cam and pin to move the blades to an open position when said master moves toward its rest position, and a shutter trigger including an arm positioned to engage and move the master member from its rest position until it slips off the master member releasing it for movement under its spring.

3. A camera shutter comprising, in combination, an apertured support, two blades pivotally mounted thereon, a single blade operating pin carried by one blade and operatively engaging the other blade, a shutter trigger pivotally mounted on the shutter having an operating arm, a pivoted master member adapted to be moved and released by the operating arm, and a spring cam carried by the master member and positioned to engage and move the single blade operating pin when said master member moves in one direction and to flex without moving said pin when the master member is moved in a reverse direction.

4. A camera shutter, comprising, in combination, an apertured support, two blades pivotally mounted thereon, a single blade operating pin carried by one blade and operatively engaging the other blade, a shutter trigger pivotally mounted on the shutter having an operating arm, a pivoted master member adapted to be moved and released by the operating arm, and a spring cam carried by the master member and positioned to engage and move the single blade operating pin when said master member moves in one direction and to flex without moving said pin when the master member is moved in a reverse direction, and a spring tending to hold the blade operating pin in a position of rest in which the shutter blades close the aperture in the support.

5. A camera shutter, comprising, in combination, an apertured support, two blades pivotally mounted thereon, a single blade operating pin carried by one blade and operatively engaging the other blade, a shutter trigger pivotally mounted on the shutter having an operating arm, a pivoted master member adapted to be moved and released by the operating arm, and a spring cam carried by the master member and positioned to engage and move the single blade operating pin when said master member moves in one direction and to flex without moving said pin when the master member is moved in a reverse direction, and a spring tending to hold the blade operating pin in a position of rest in which the shutter blades close the aperture in the support, the spring cam including a cut out area through which the blade opening pin passes after the master member has opened the blades and to enable the blades to be closed by their spring.

6. A camera shutter, comprising, in combination, an apertured support, two blades pivotally mounted thereon, a single blade operating pin carried by one blade and operatively engaging the other blade, a shutter trigger pivotally mounted on the shutter having an operating arm, a pivoted master member adapted to be moved and released by the operating arm, and a spring cam carried by the master member and positioned to engage and move the single blade operating pin when said master member moves in one direction and to flex without moving said pin when the master member is moved in a reverse direction, and a spring tending to hold the blade operating pin in a position of rest in which the shutter blades close the aperture in the support, the spring cam including a beveled cam surface and a substantially arcuate cam surface ending at a cut out portion whereby movement of the master member may drive the blades open and hold them open in moving in one direction and may cause the spring cam to flex in moving in an opposite direction whereby in setting the master member the cam may spring about the blade operating pin.

CARL C. FUERST.